(12) United States Patent
Heiden

(10) Patent No.: US 7,889,338 B2
(45) Date of Patent: Feb. 15, 2011

(54) COORDINATE MEASURING MACHINE AND METHOD FOR STRUCTURED ILLUMINATION OF SUBSTRATES

(75) Inventor: Michael Heiden, Woelfersheim (DE)

(73) Assignee: Vistec Semiconductor Systems GmbH, Weilburg (DE)

(*) Notice: Subject to any disclaimer, the term of this patent is extended or adjusted under 35 U.S.C. 154(b) by 210 days.

(21) Appl. No.: 12/154,826

(22) Filed: May 27, 2008

(65) Prior Publication Data
US 2008/0304058 A1 Dec. 11, 2008

(30) Foreign Application Priority Data
May 30, 2007 (DE) .................. 10 2007 025 306

(51) Int. Cl.
*G01J 4/00* (2006.01)
(52) U.S. Cl. ........................ 356/364; 356/603
(58) Field of Classification Search ............ 356/364, 356/603
See application file for complete search history.

(56) References Cited

U.S. PATENT DOCUMENTS

| 6,466,315 | B1* | 10/2002 | Karpol et al. ............ 356/237.4 |
| 7,027,143 | B1* | 4/2006 | Stokowski et al. ....... 356/237.2 |
| 7,361,234 | B2* | 4/2008 | Hickman et al. .............. 134/21 |
| 2002/0186879 | A1 | 12/2002 | Hemar et al. |
| 2007/0122718 | A1* | 5/2007 | Mizusako et al. .............. 430/5 |
| 2008/0304058 | A1* | 12/2008 | Heiden .................... 356/237.5 |

FOREIGN PATENT DOCUMENTS

| EP | 0628806 | 12/1994 |
| EP | 1081489 | 3/2001 |

OTHER PUBLICATIONS

Dr. Carola Bläsing, Pattern Placement Metrology for Mask Making, Mar. 31, 1998, pp. 1-11, Leica Microsystems AG, Wetzlar, Germany.
Proc. of SPIE, Zibold et al., Printability Study With Polarisation Capable AIMS fab 193i to Study Polarisation Effects, vol. 6152, pp. 1-8, Feb. 20, 2006, San Jose, California, USA, Metrology, Inspection, and Process Control for Microlithography XX.

* cited by examiner

*Primary Examiner*—Roy Punnoose
(74) *Attorney, Agent, or Firm*—Simpson & Simpson, PLLC

(57) ABSTRACT

A coordinate measuring machine for the structured illumination of substrates is disclosed. The incident light illumination means and/or the transmitted light illumination means have a pupil access via which at least one optical element is positionable in the optical illumination path. The size and/or type and/or the polarization of the pupil illumination may be manipulated such that the structured illumination of the substrate in the coordinate measuring machine corresponds to the structured illumination of this substrate in the exposure process with a stepper.

15 Claims, 16 Drawing Sheets

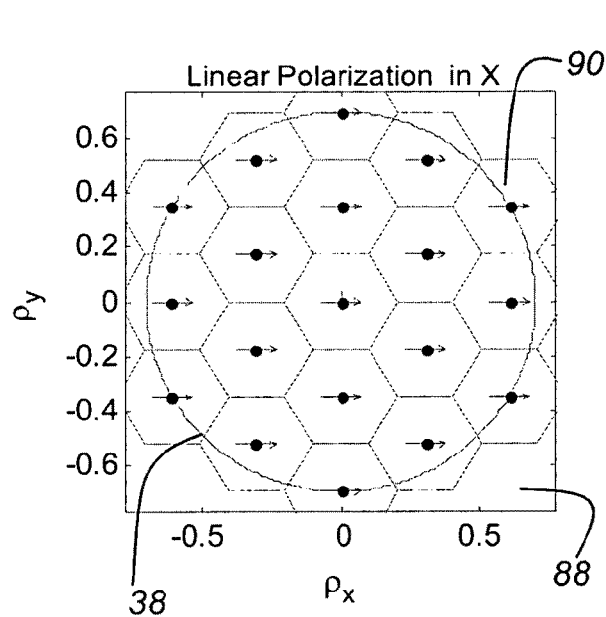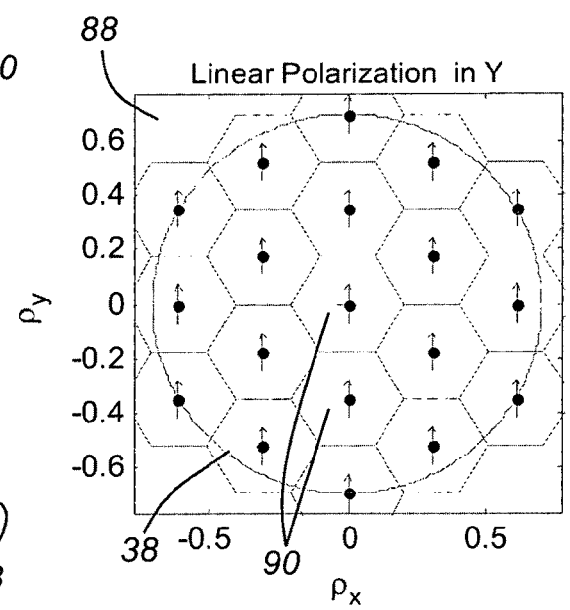
Fig. 9a
Fig. 9b

COORDINATE MEASURING MACHINE AND METHOD FOR STRUCTURED ILLUMINATION OF SUBSTRATES

CROSS REFERENCE TO RELATED APPLICATIONS

This patent application claims priority of German Patent Application No. 10 2007 025 306.2, filed on May 30, 2007, which application is incorporated herein by reference.

FIELD OF THE INVENTION

The invention relates to a coordinate measuring machine for the structured illumination of substrates.

The invention further relates to a method for the structured illumination of substrates. In particular, the invention relates to a method for the structured illumination of substrates with an incident light illumination means and/or a transmitted light illumination means, each defining an optical illumination path.

BACKGROUND OF THE INVENTION

A coordinate measuring machine for measuring structures on substrates, which is used for the production of wafers, is described in the lecture script "pattern placement metrology for mask making" by Dr. Carola Bläsing. The lecture was given on the occasion of the Semicon conference, Education Program, in Geneva on Mar. 31, 1998. For details on the operation and structure of the coordinate measuring device, please see the mentioned publication and the commercially available devices (currently IPRO III).

Since the present invention may be used advantageously in a coordinate measuring machine, there is primarily described such a coordinate measuring machine without limiting the generality. In the present application, the terms "samples", "substrate" and the general term "object" are used as synonyms. In the production of semiconductor chips arranged on wafers, the structure widths of the individual structures are becoming smaller and smaller as the packing density increases. Correspondingly, the requirements for the specification of coordinate measuring machines used as measuring and inspection systems for measuring edges and positions of structures and for measuring the structure widths are increasing.

In addition, the modern masks in the semiconductor industry are very often used with a structured illumination in the stepper so that the structures are imaged on the wafer with this structured illumination. It is very important for the user to know the position and the dimension of a structure on a substrate illuminated with an illumination as it is also used in the stepper for the production. The exact geometry of this illumination ultimately depends on the structures on the mask or the substrate. For example, dipole illumination is very often used for masks on which mainly dense line arrays are to be imaged. This has the advantage that the contrast of the mask image on the wafer is increased as compared to a homogeneously illuminated, rotationally symmetric pupil. The prior art coordinate measuring machines operate with a homogeneously illuminated pupil of fixed size. The pupil size or shape cannot be adjusted. In addition, there is also used unpolarized light.

SUMMARY OF THE INVENTION

It is the object of the invention to provide a coordinate measuring machine with which the position and dimension of structures on a substrate may be determined considering the illumination used in a stepper.

This object is achieved by a coordinate measuring machine comprising an incident light illumination means and/or a transmitted light illumination means, each defining an optical illumination path, at least one optical element is designed to be positioned at a predetermined location in the optical illumination path, wherein the optical element is designed to manipulate the size and/or the type and/or the polarization of the illumination of a pupil such that the structured illumination of the substrate in the coordinate measuring machine corresponds to the structured illumination of the same substrate in the exposure process with a stepper.

It is a further object of the present invention to provide a method with which the position and/or the dimension of structures on a substrate are measured such that the illumination for a stepper in the production of wafers is considered.

This object is achieved by a method comprising the steps of: positioning at least one optical element in the optical illumination path; and manipulating the size and/or the type and/or the polarization of the illumination of a pupil by the optical element such that the structured illumination of the substrate in the coordinate measuring machine is adapted to the structured illumination of this substrate in the exposure process with a stepper.

It is particularly advantageous if a coordinate measuring machine for the structured illumination of substrates is provided with an incident light illumination means and/or a transmitted light illumination means. Both the incident light illumination means and the transmitted light illumination means define an optical illumination path. The incident light illumination means and/or the transmitted light illumination means have a pupil access via which at least one optical element is positionable in the optical illumination path. The size and/or the type and/or the polarization of the pupil illumination may be manipulated such that the structured illumination of the substrate in the coordinate measuring machine corresponds to the structured illumination of this substrate in the exposure process with a stepper.

A method for the structured illumination of substrates with an incident light illumination means and/or a transmitted light illumination means, each defining an optical illumination path, is also advantageous. For the method, at least one optical element is first positioned in the optical illumination path. The size and/or the type and/or the polarization of the pupil illumination are manipulated by the optical element such that the illumination type during the measurement is adapted to the structured illumination of a stepper for this substrate.

The transmitted light illumination means of the coordinate measuring machine includes an illumination condenser having a pupil. In the case of transmitted light illumination of the substrate, the optical element is positioned in a predetermined place in an intermediate image plane in which the imaging of the pupil is performed. It is also possible that, in the case of transmitted light illumination of the substrate, the optical element is performed in the pupil access of the illumination condenser.

The incident light illumination means includes an objective having a pupil. In the case of incident light illumination of the substrate, the optical element may be positioned in an intermediate image plane in which the imaging of the pupil is performed.

The at least one optical element may be attached to an exchange element and may thus be positioned in the optical illumination path as required and depending on the selected illumination type.

The at least one optical element may have a plate-like shape. The optical element may also be implemented as a plane-parallel plate. The optical element may also be implemented in the form of a non-plane-parallel plate.

The optical element may be designed such that the result is an illumination with an aperture NA that may be adjusted in a defined way. The optical element may be an adjustable iris diaphragm. It is also contemplated that the optical element is a fixed aperture having a fixed diameter.

Several fixed apertures are attached to a carrier. By means of the carrier, the aperture required for the illumination in the coordinate measuring machine may be positioned in the optical illumination path as required.

The optical element may be designed such that the result is a ring-shaped illumination.

The optical element may be designed such that the result is an illumination with two illumination poles.

The optical element may be designed such that the result is an illumination with four illumination poles.

The optical element may be designed such that areas are applied in a rotationally symmetric way to apodize the illumination pupil.

The optical element may be designed such that there are applied areas with materials differing in transmittance and/or reflectance.

The optical element may be produced lithographically or by vapor deposition of materials having different properties.

The optical element may consist of an array of micro-mirrors so that an illumination structure may be set directly via the position of the micro-mirrors. The optical element may also be an LCD display, so that different transmissions may be set at the optical element.

The pupil may be illuminated by backlighting. In that way, the intensity distribution in the pupil may, for example, be designed ring-shaped. It is also possible to add a circular illumination of the pupil. The optical element may thus be combined with backlighting of the pupil. The optical element may further be combined with at least one polarizing element which may also be arranged in the optical illumination path.

The polarizing element may be a polarization filter. The polarization filter is designed as a film filter. The polarization filter may also be designed as a crystal filter. The crystal filter may be a Nicol, Glan-Thompson, Glan-Taylor, Rochon or Wollaston prism.

The polarizing element may be a quarter-wave plate or a half-wave plate adapted to the wavelength of the illumination light.

The optical element may consist of a segmented polarizing element without necessarily having to be coupled to a microlens array. For example, the microlens array may also be used without any polarization filter. A number of combinations are possible. There may be provided only one element for geometric forming so that a circle or a ring or poles may be generated. It is also possible that an element for polarization may be provided. This element may also be segmented. Several elements having different optical properties may also be combined. As a special case, an associated polarization filter may be added upstream of each element of the microlens array. The illumination light may be linearly polarized, circularly polarized, radially polarized or tangentially polarized.

Further advantageous embodiments of the invention may be found in the dependent claims.

BRIEF DESCRIPTION OF THE DRAWINGS

In the following, embodiments of the invention and their advantages will be explained with reference to the accompanying drawings, in which:

FIG. 2b shows a ring aperture with a larger aperture than in FIG. 2a;

FIG. 4b shows a schematic representation of a dipole illumination, wherein the dipoles are rotated by 90° as compared to FIG. 4a;

FIG. 5b shows a schematic representation of the quadrupole illumination of FIG. 5a, wherein the quadrupoles are rotated by 45° with respect to the representation shown in FIG. 5a;

FIG. 6b shows another embodiment differing from the illumination type shown in FIG. 6a;

FIG. 6c shows another illumination embodiment differing from the illumination shown in FIG. 6a;

FIG. 6d shows another illumination embodiment differing from the illumination type shown in FIG. 6a;

FIG. 7b shows an embodiment of the dipole illumination rotated by 90° as compared to FIG. 7a;

FIG. 7c shows a further embodiment of the illumination type as shown in FIG. 7a;

FIG. 7d shows a further embodiment of the illumination as shown in FIG. 7a;

FIG. 8b shows a further embodiment of the illumination illustrated in FIG. 8a, wherein the quadrupoles are rotated by 45° with respect to the embodiment shown in FIG. 8a;

FIG. 9a shows a schematic representation of an example of a linearly polarized illumination pupil constructed of several segments, wherein the individual segments are oriented in a linearly polarized way in the X-direction;

FIG. 9b shows a further embodiment of the linearly polarized illumination pupil, wherein the individual segments are oriented in the Y-direction;

DETAILED DESCRIPTION OF THE INVENTION

Figure 1:
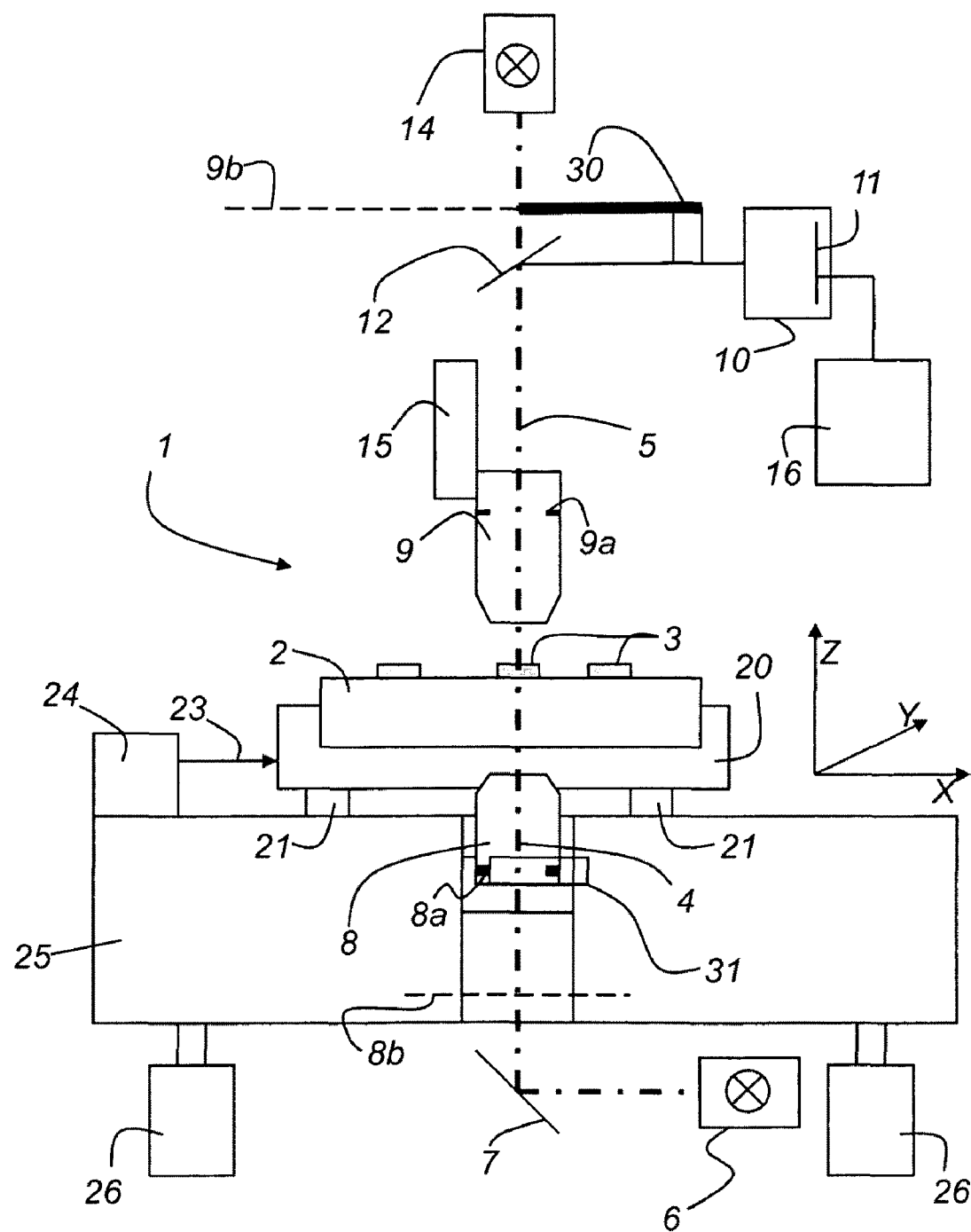
FIG. 1 shows a schematic structure of a coordinate measuring machine as used for implementing the present invention.

FIG. 1 shows a coordinate measuring machine as already known for some time from prior art for measuring structures on masks and/or wafers. Using the embodiment of a coordinate measuring machine 1 shown in FIG. 1, a substrate 2 may be optically inspected and measured. Substrate 2 is a mask exemplarily consisting of silica and used for producing semiconductors. Several structures 3 are applied to the mask and may be measured with coordinate measuring machine 1. Coordinate measuring machine 1 includes two optical illumination paths 4 and 5, wherein optical illumination path 4 is provided for the transmitted light mode, and optical illumination path 5 is provided for the incident light mode. An inverse construction of the coordinate measuring machine is also possible. Inverse construction means that the surface of substrate 2 carrying structures 3 is oriented towards gravity. For the transmitted light mode, a light source 6 is provided which directs the light via a mirror 7 towards a condenser 8. The light of optical illumination path 4 passes through substrate 2, and at least most of it is collected by a measurement objective 9 and imaged on a detector 10. Detector 10 consists of a CCD chip 11 converting the optical signals collected by measurement objective 9 to electrical signals.

The light collected by measurement objective 9 is directed towards detector 10 (implemented as a camera) or CCD chip 11 by means of a mirror 12. There is further also provided a light source 14 in incident light optical path 5 with which substrate 2 or structures 3 are illuminated. Measurement objective 9 is provided with a focus means 15 moving measurement objective 9 in the Z-coordinate direction. Thus structures 3 on substrate 2 may be captured in different focus planes by measurement objective 9. Similarly, it is possible to displace condenser 8 in the Z-coordinate direction.

CCD chip 11 of detector 10 is connected to a computer evaluation unit 16, with which the data obtained from CCD chip 11 may be read out and computed correspondingly. Computer evaluation unit 16 is also provided for controlling a measurement table 20 in the Y-coordinate direction and in the X-coordinate direction. A user may also perform input via computer evaluation unit 16 so that corresponding measuring and evaluating methods may be performed with coordinate measuring machine 1. In addition, computer evaluation unit 16 may be used to pivot or move optical elements or optical members into incident light optical path 5 or transmitted light optical path 4. In the embodiment shown in FIG. 1, measurement objective 9 has a pupil 9a, and condenser 8 has a pupil 8a. The condenser has a pupil access 31 via which an optical element (not shown here) may be brought into transmitted light optical path 4. In transmitted light optical path 4, an optical element 35 (see, for example, FIG. 2a) may also be positioned in an intermediate image plane 8b into which pupil 8a of condenser 8 is imaged. Optical element 35 may also be positioned in incident light optical path 4. The place where optical element 35 is positioned is also an intermediate image plane 9b in which pupil 9a of measurement objective 9 is imaged. FIG. 1 also shows an exchange element 30 with which several optical elements, as desired by the user, may be brought into the optical path of coordinate measuring machine 1. Although there is only shown the arrangement of exchange element 30 in intermediate image plane 9b where pupil 9a of measurement objective 9 is imaged, someone skilled in the art will understand that exchange element 30 may also be positioned at pupil access 31 of condenser 8 or in intermediate image plane 8b, the image of pupil 8a of condenser 8.

Substrate 2 is located on measurement table 20, which, as mentioned above, is positioned to be movable in the X-coordinate direction and in the Y-coordinate direction. The movement of measurement table 20 is performed with the help of air bearings 21. A laser interferometer system 24 with which the position of the measurement table may be determined interferometrically with the help of a light beam 23 is shown only schematically. With the help of air bearings 21, measurement table 20 is positionable more or less frictionless on a granite block 25 and may thus be moved in the X-coordinate direction and in the Y-coordinate direction. Granite block 25 itself is positioned on legs 26 with anti-vibration measure.

Figure 2A:
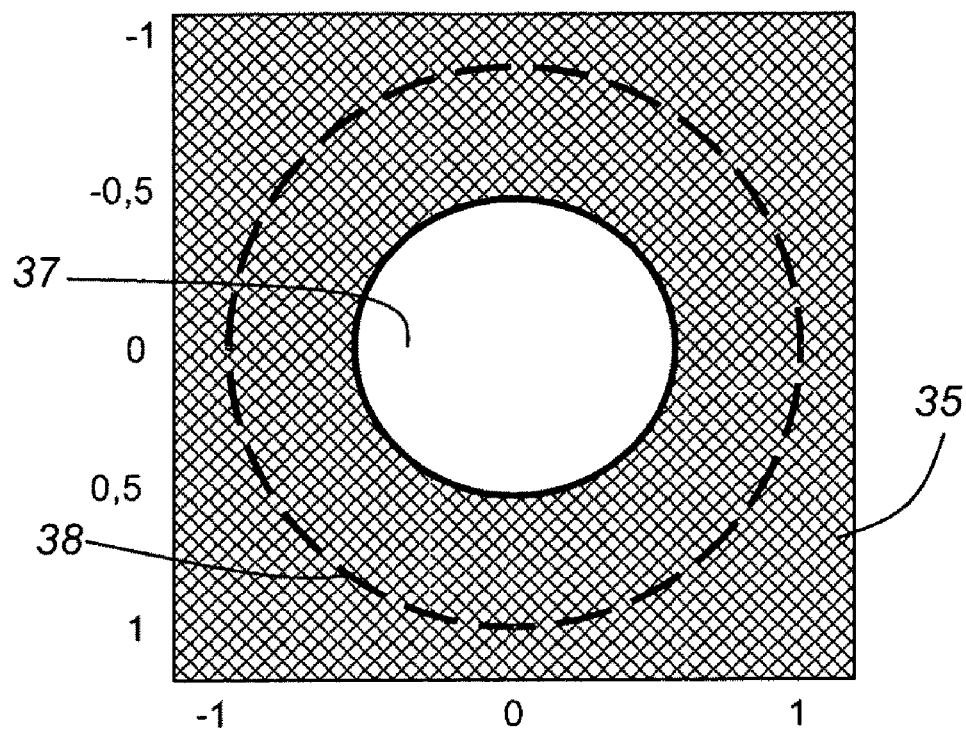
FIG. 2a shows a circular illumination with a small aperture for the illumination.
Figure 2B:
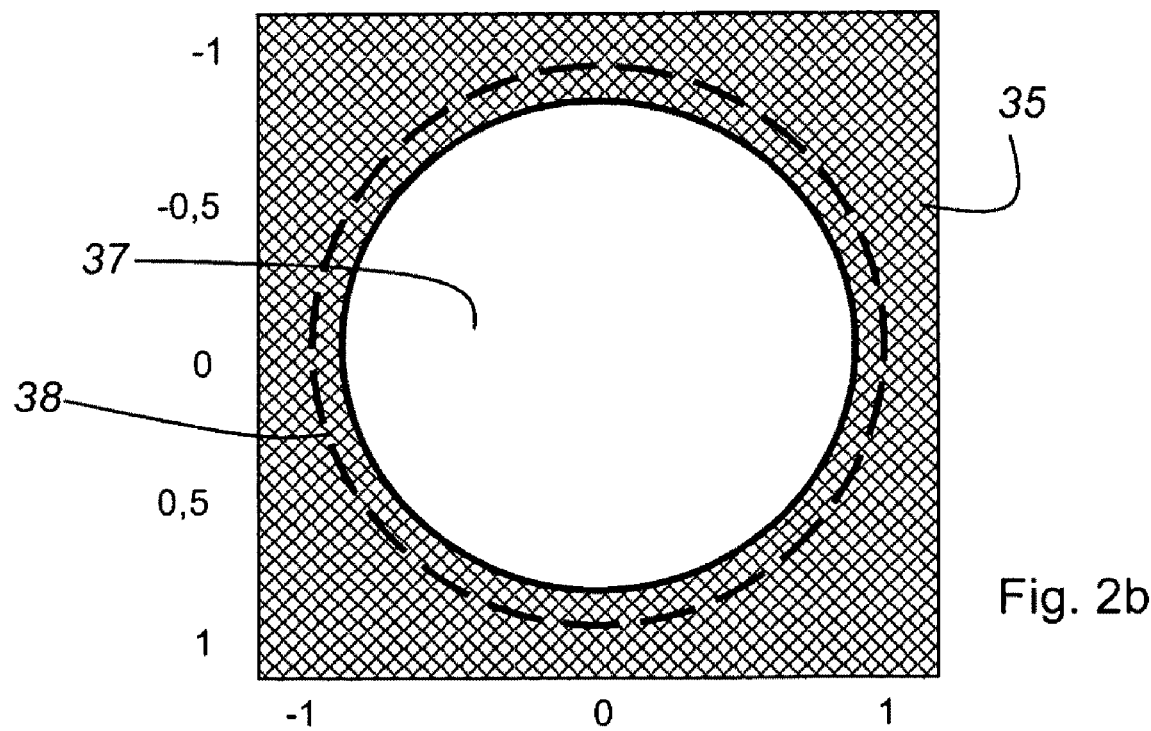
Figure 3A:
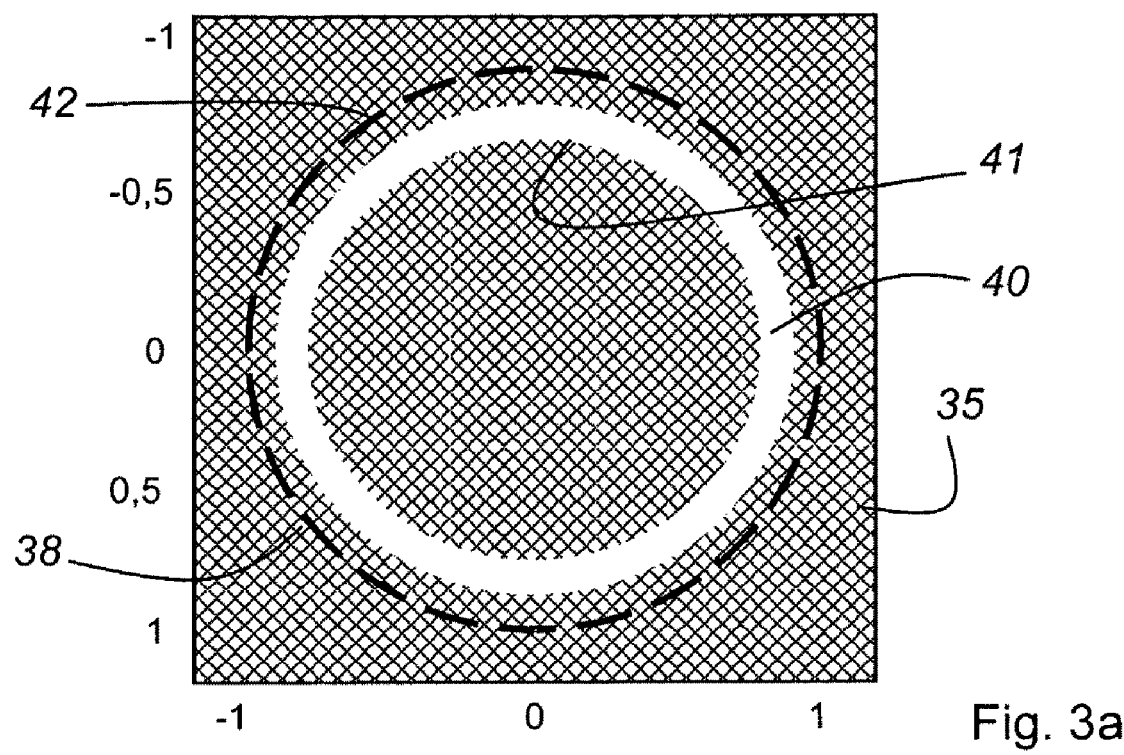
FIG. 3a shows a ring-shaped illumination, wherein the outer aperture of the ring approximately corresponds to the aperture diameter of the objective.
Figure 3B:
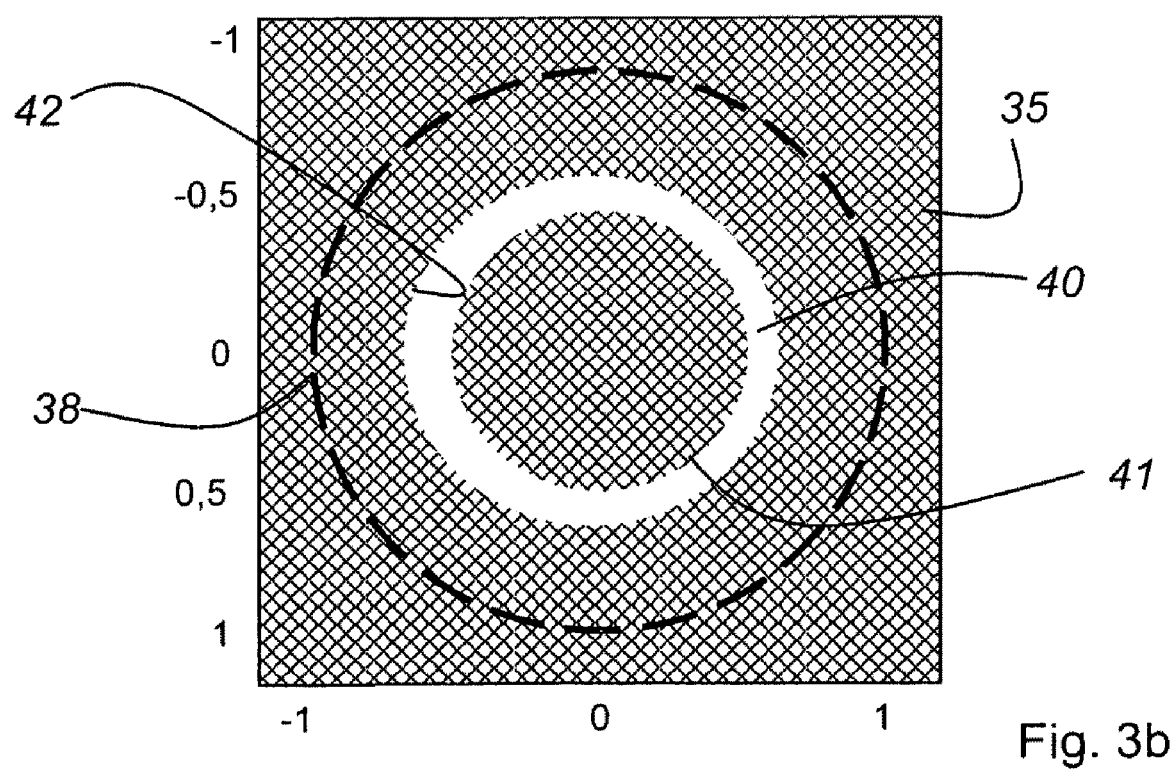
FIG. 3b shows a further embodiment of a ring illumination.
Figure 3C:
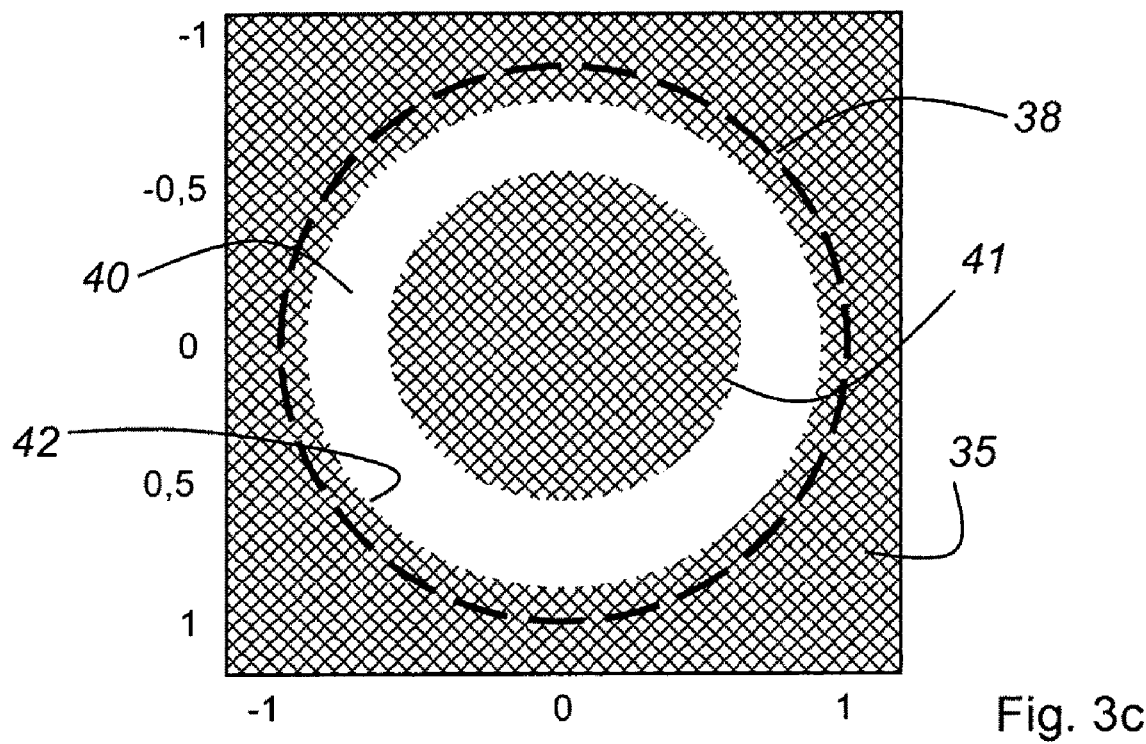
FIG. 3c shows a further embodiment of a ring illumination, wherein the difference between inner and outer aperture exceeds that in FIGS. 3a and 3b.
Figure 3D:
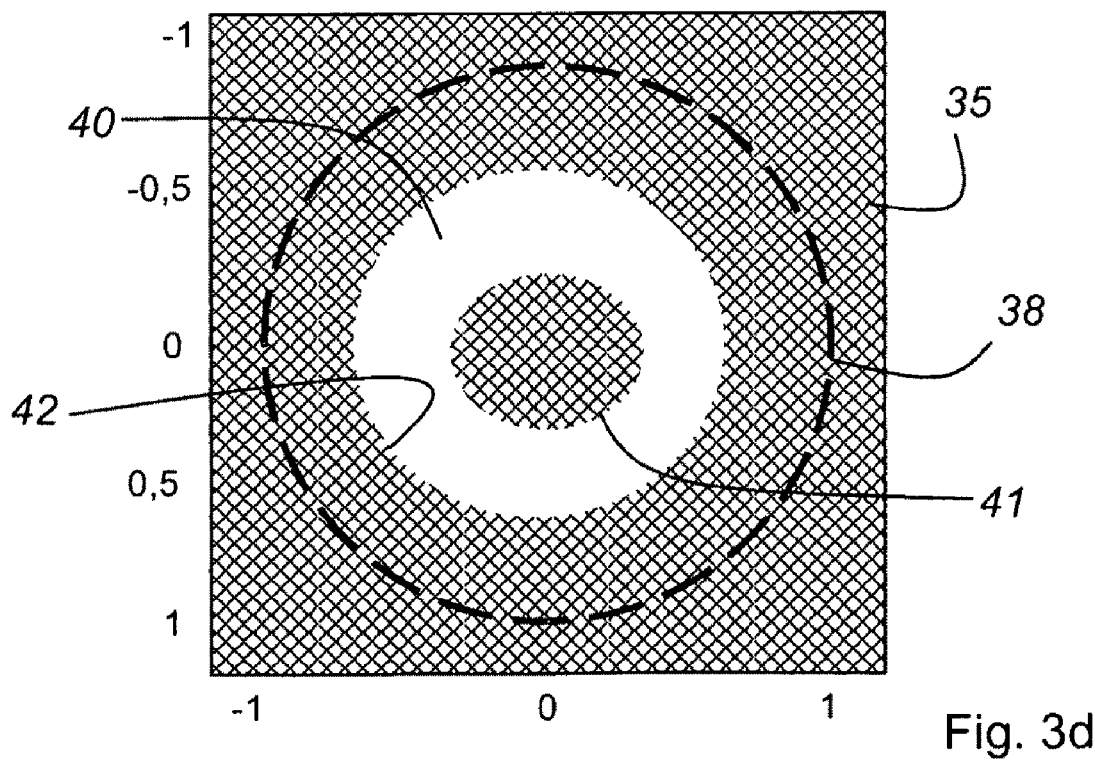
FIG. 3d shows a further embodiment of a ring illumination.

FIG. 2a shows an embodiment of optical element 35 that may be brought into the optical path of coordinate measuring machine 1. As mentioned above, optical element 35 may be positioned in pupil access 31 of condenser 8 or in an intermediate image plane of the imaging of pupil 8a of the condenser or pupil 9a of measurement objective 9. In that case, the illumination is configured such that, without diaphragm, the objective pupil is illuminated completely homogeneously (or in the case of transmitted light the area covered by the condenser). The structuring of the pupil may then easiest be achieved in an intermediate image plane of the entrance pupil. It is then also homogeneously illuminated with suitable imaging optics. An aperture having the required structure may then, for example, be used in the intermediate image plane, as shown in FIG. 1. This allows realizing the desired illumination in a very easy way. The embodiment of optical element 35 shown in FIG. 2a shows a circular illumination. Illumination pupil 37 fills only a small part of objective pupil 38 (circle marked by a broken line). An iris diaphragm (not shown here) may be used to change the degree to which objective pupil 38 is filled. It is also contemplated to use exchange element 30 to place several apertures of different diameters into the optical path of coordinate measuring machine 1. FIG. 2b represents the case that illumination pupil 37 is larger than in FIG. 2a. However, the illumination pupil is still smaller than objective pupil 38.

As mentioned above, the radius of the numerical aperture of illumination pupil 37 ($NA_3$) may, for example, be adjusted by means of an iris diaphragm or pinhole aperture (not shown) in pupil access 31 or in one of two intermediate image planes 8b and 9b to achieve completely filled objective pupil 38. The parameter to be controlled is thus the radius of illumination pupil 37 used.

FIGS. 3a, 3b, 3c and 3d show a ring illumination as an embodiment of optical element 35. A ring 40 for the ring illumination is smaller than objective pupil 38. In the shown figures, different sizes of ring 40 for the ring illumination are illustrated. The size of ring 40 may be adjusted by an inner aperture 41 and an outer aperture 42. Inner aperture 41 and outer aperture 42 are the parameters to be set or controlled.

The geometry of the illumination ultimately depends on the structures on the substrate or the mask based on which the user selects the illumination.

Figure 4A:
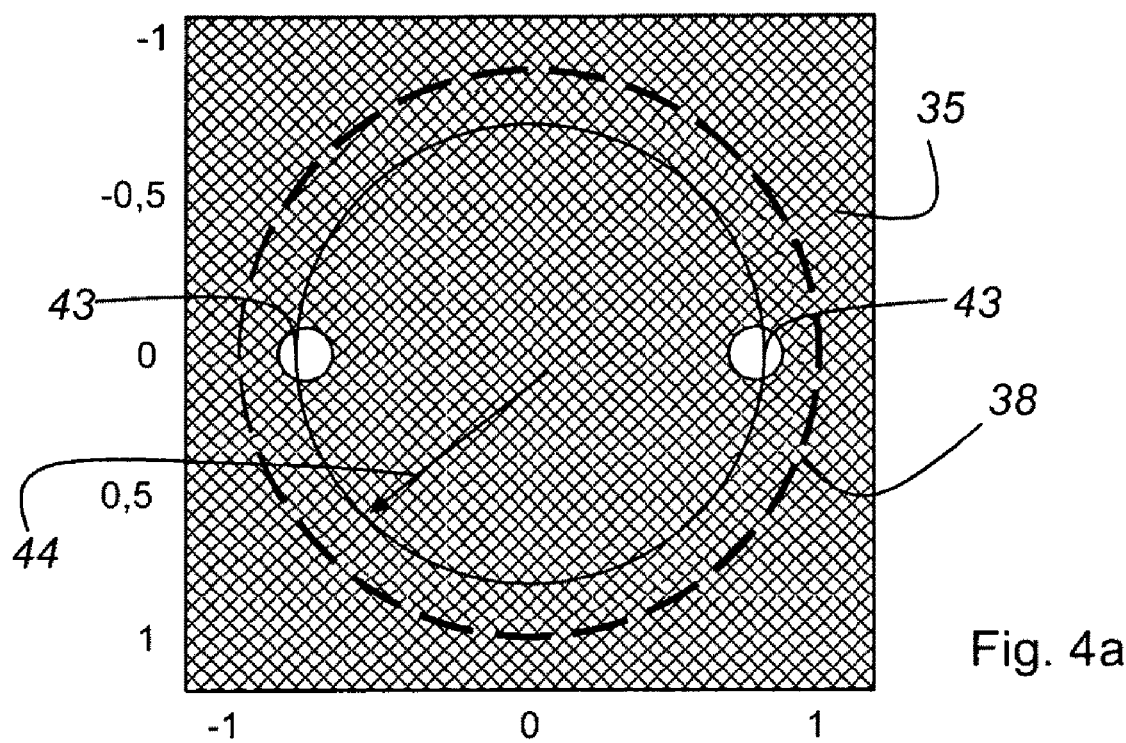
FIG. 4a shows a schematic representation of a dipole illumination (two illumination poles)
Figure 4B:
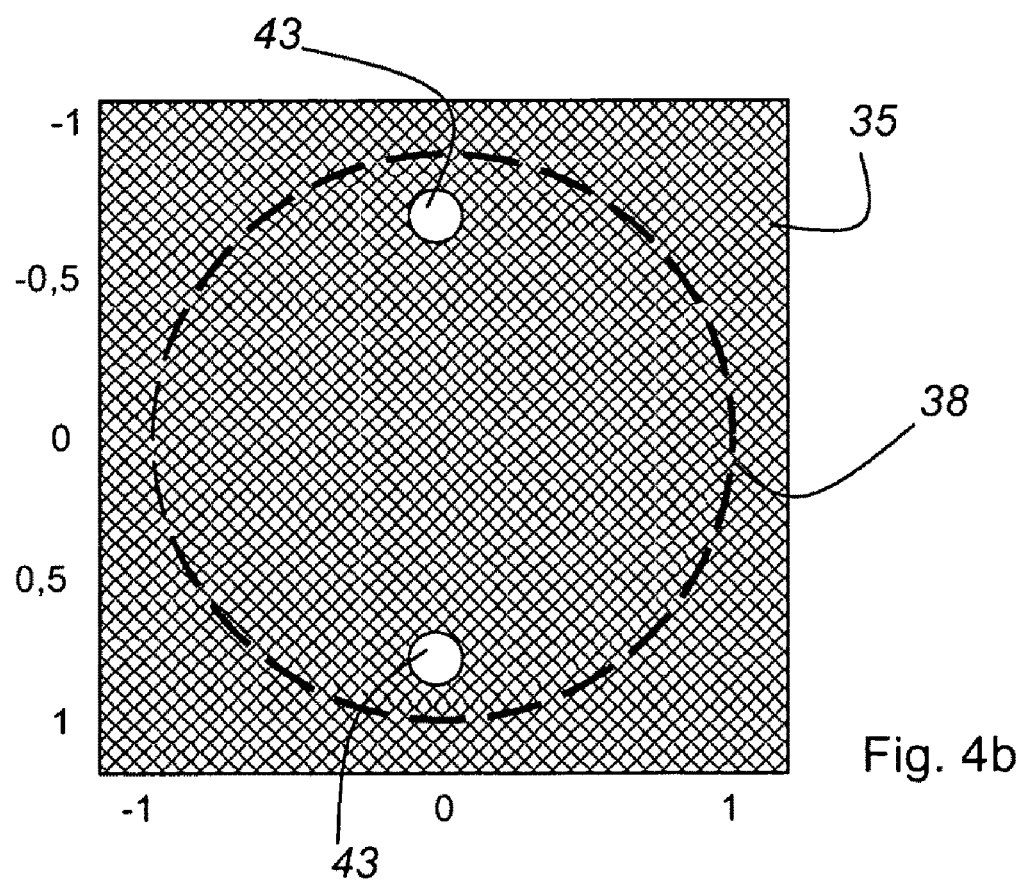
Figure 4C:
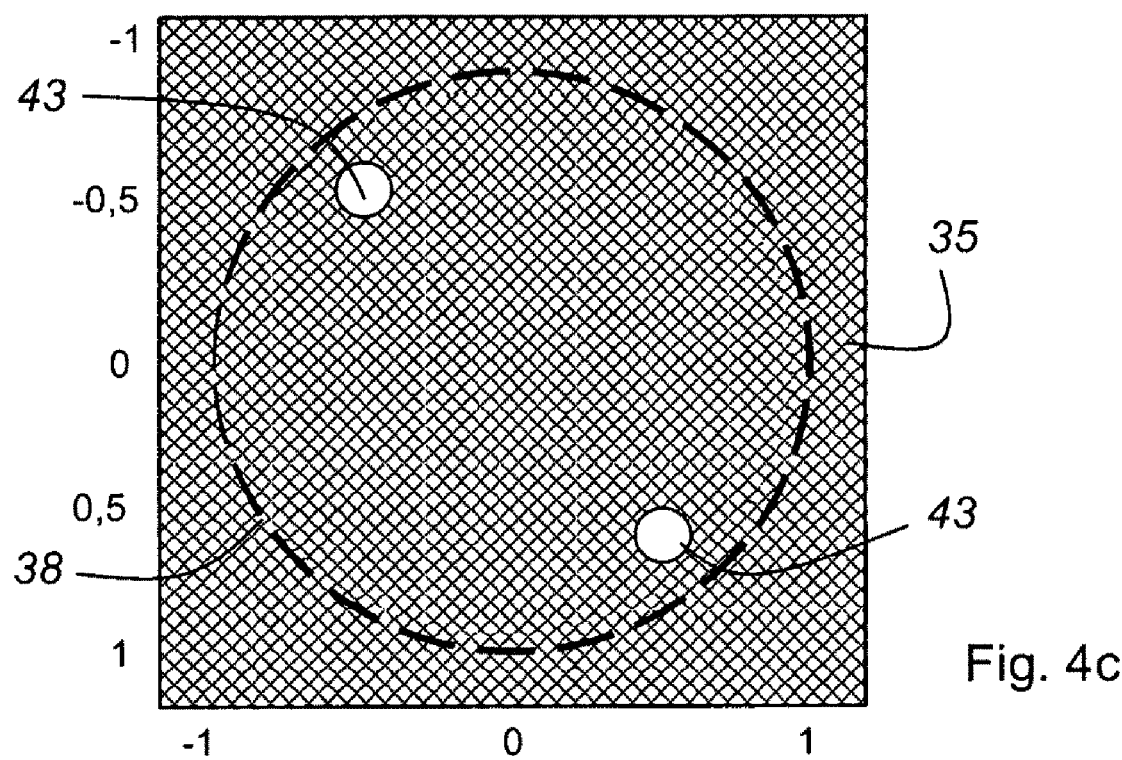
FIG. 4c shows a schematic representation of the dipole illumination, wherein the dipoles are rotated by −45° with respect to the vertical axis.
Figure 4D:
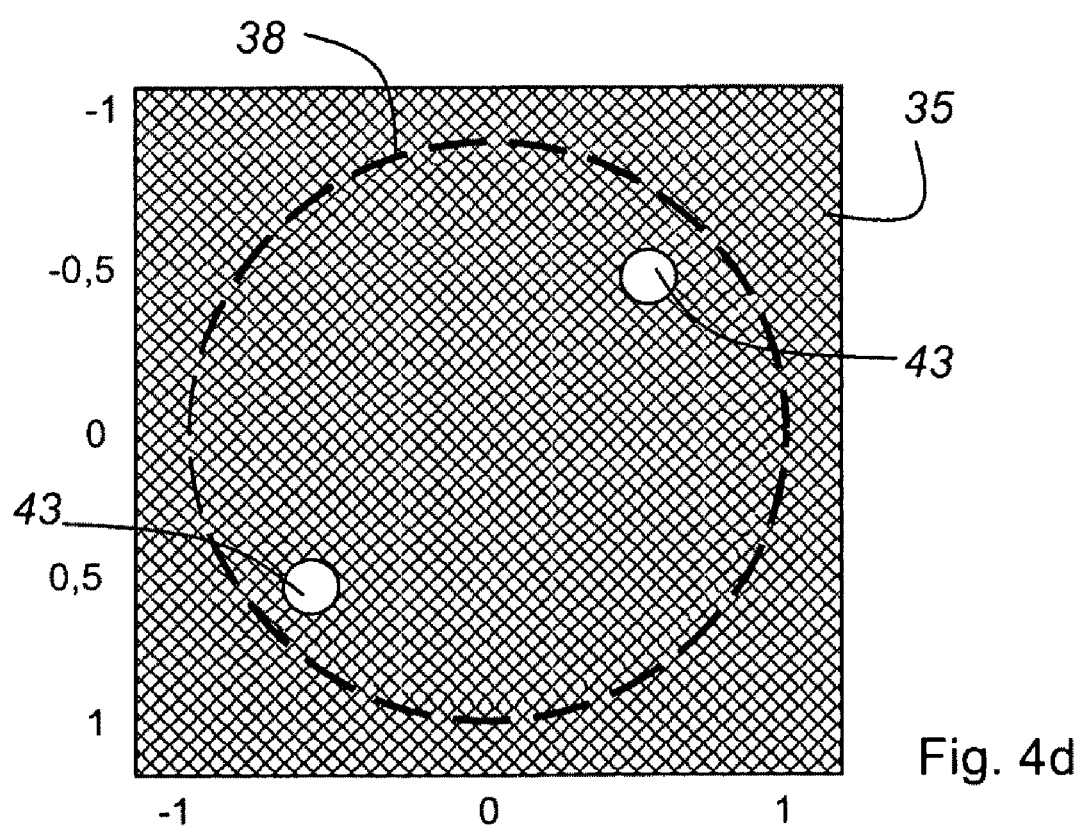
FIG. 4d shows a schematic representation of a dipole illumination, wherein the dipoles are rotated by +45° with respect to the vertical.

FIGS. 4a, 4b, 4c and 4d show a further embodiment of optical element 35 that is mainly used for masks or substrates on which dense line arrays are to be imaged. In this case, a so-called dipole illumination is used. Two illumination poles 43 are arranged within the diameter of objective pupil 38. Illumination poles 43 are arranged to be opposite to each other. For this optical element 35, the parameters to be controlled are a radius 44 on which illumination poles 43 are arranged. In addition, the aperture $NA_{dipole}$ of illumination poles 43 is variable. Another possibility is the orientation of individual illumination poles 43. In FIG. 4b, illumination poles 43 are rotated by 90° with respect to the arrangement shown in FIG. 4a. In FIG. 4c, the arrangement of illumination poles 43 is rotated by 45° with respect to the arrangement of illumination poles 43 in FIG. 4a. A further arrangement of illumination poles 43 is shown in FIG. 4d, wherein illumination poles 43 are rotated by 135° with respect to the arrangement of illumination poles 43 in FIG. 4a. It is clear that other orientations may be set. Radius 44 on which two illumination poles 43 are arranged in the dipole arrangement is adapted to the pitch dimension of the mask or substrate.

Figure 5A:
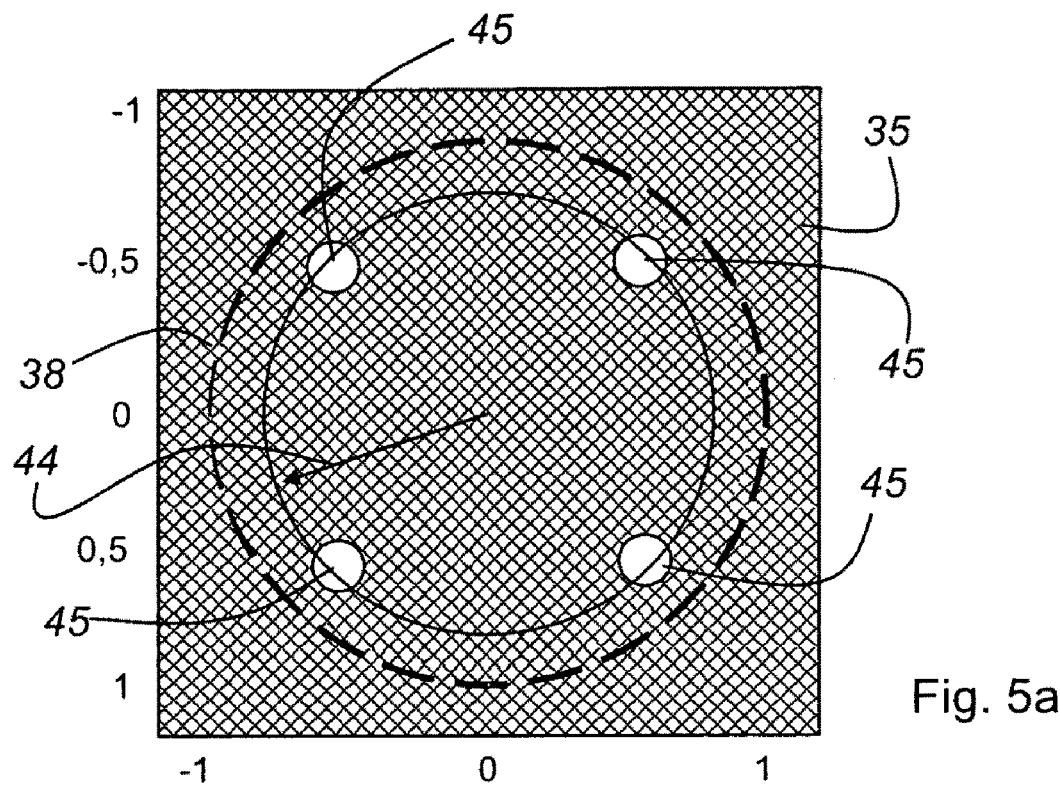
FIG. 5a shows a schematic representation of a quadrupole illumination.
Figure 5B:
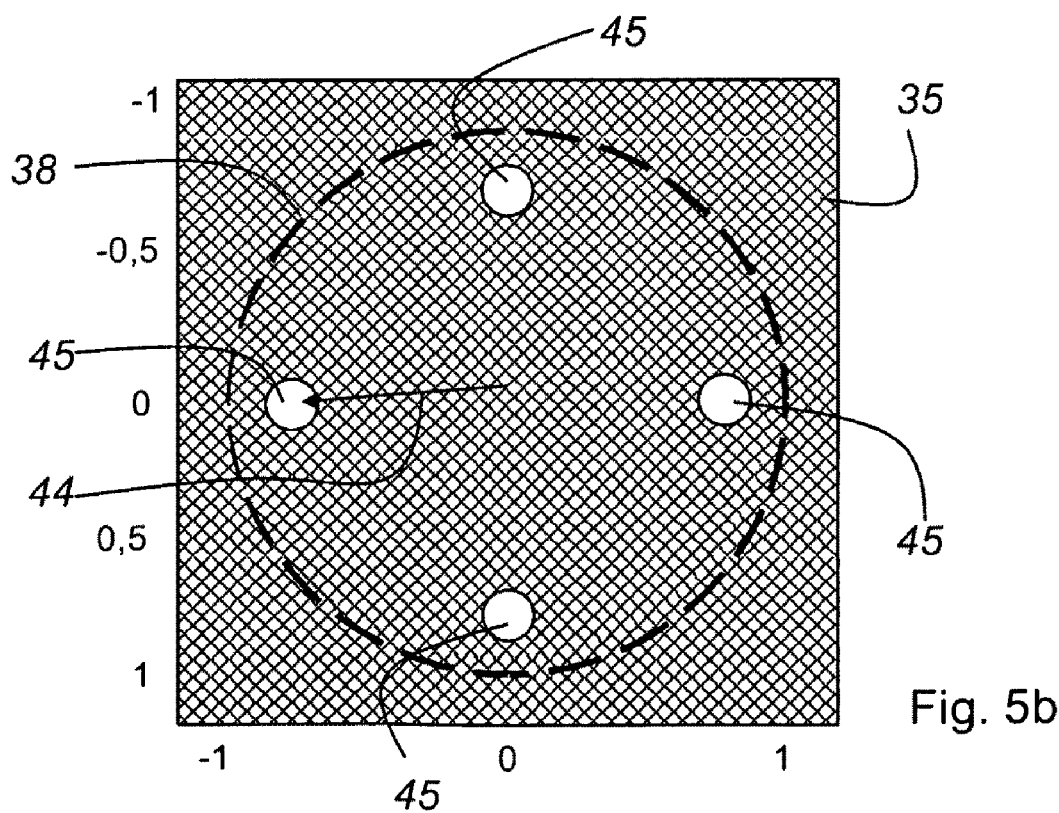
Figure 6A:
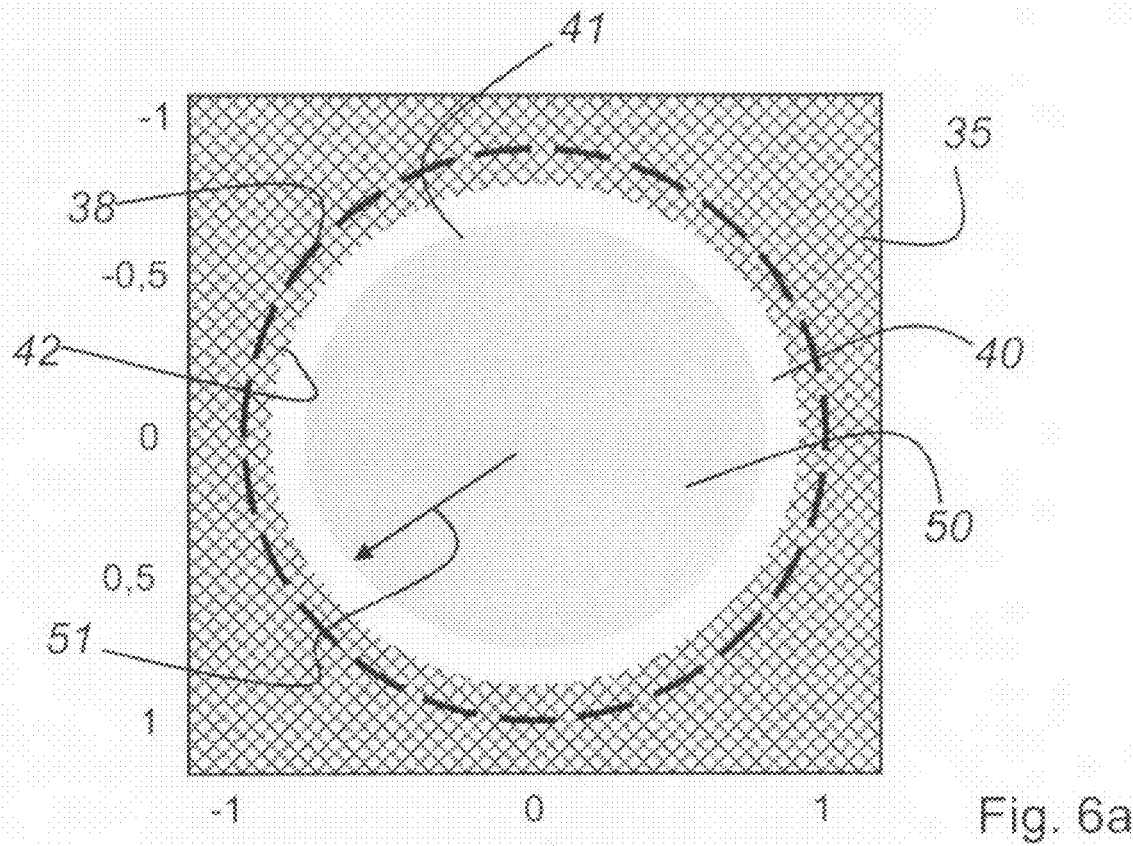
FIG. 6a shows a schematic representation of an embodiment of an illumination generated by circular backlighting and a ring illumination.
Figure 6B:
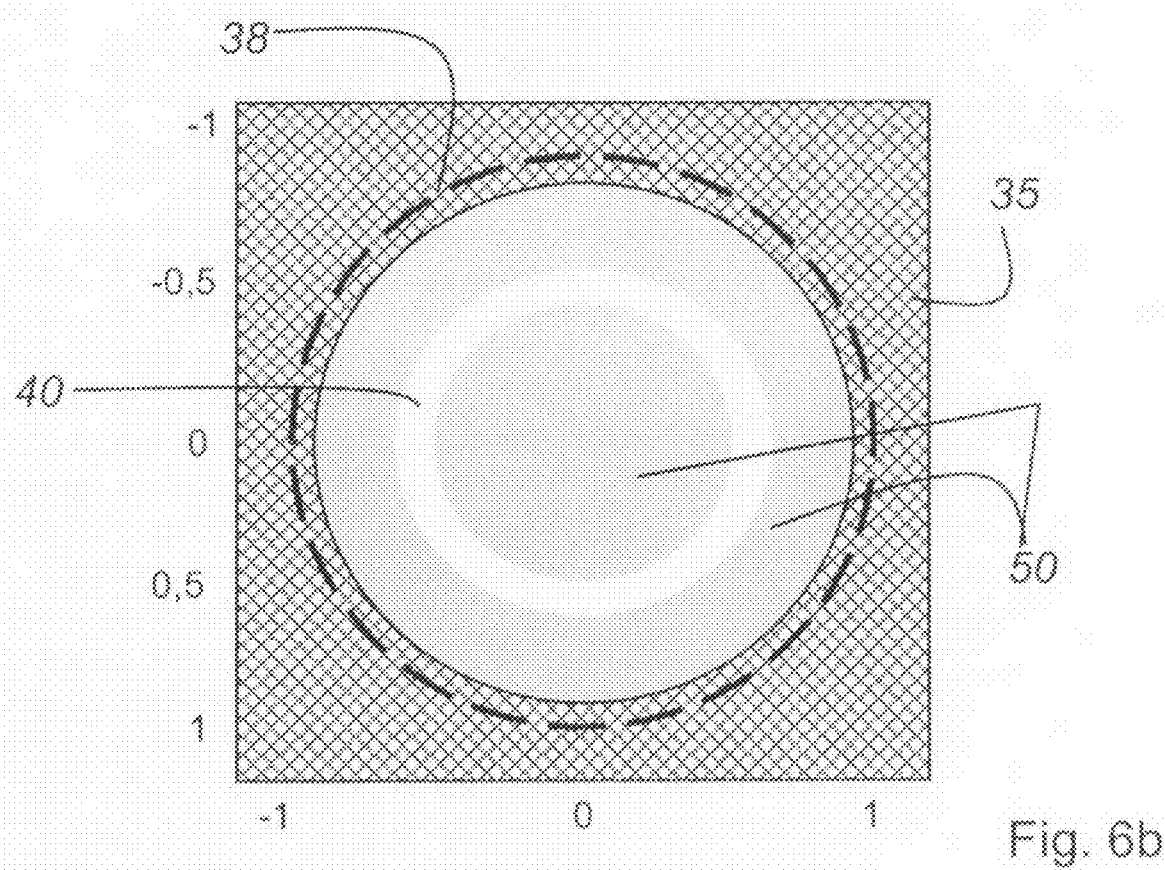
Figure 6C:
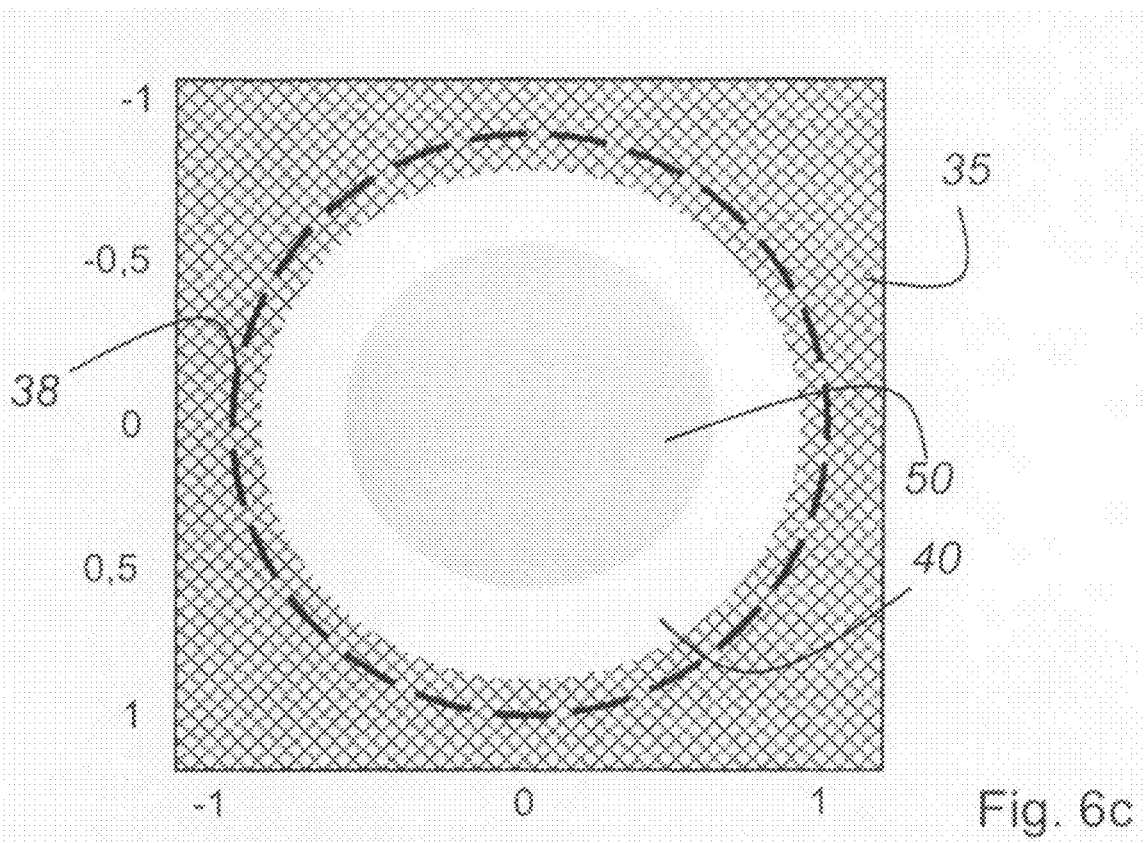
Figure 6D:
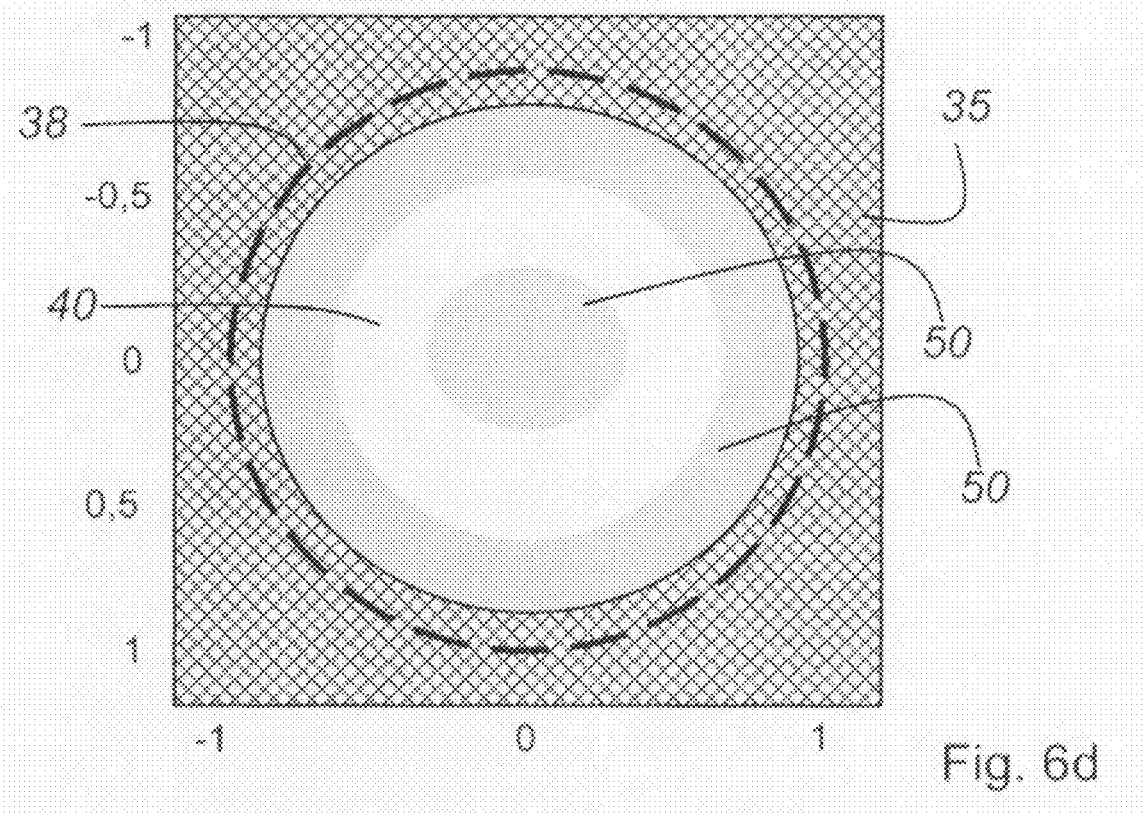
Figure 7A:
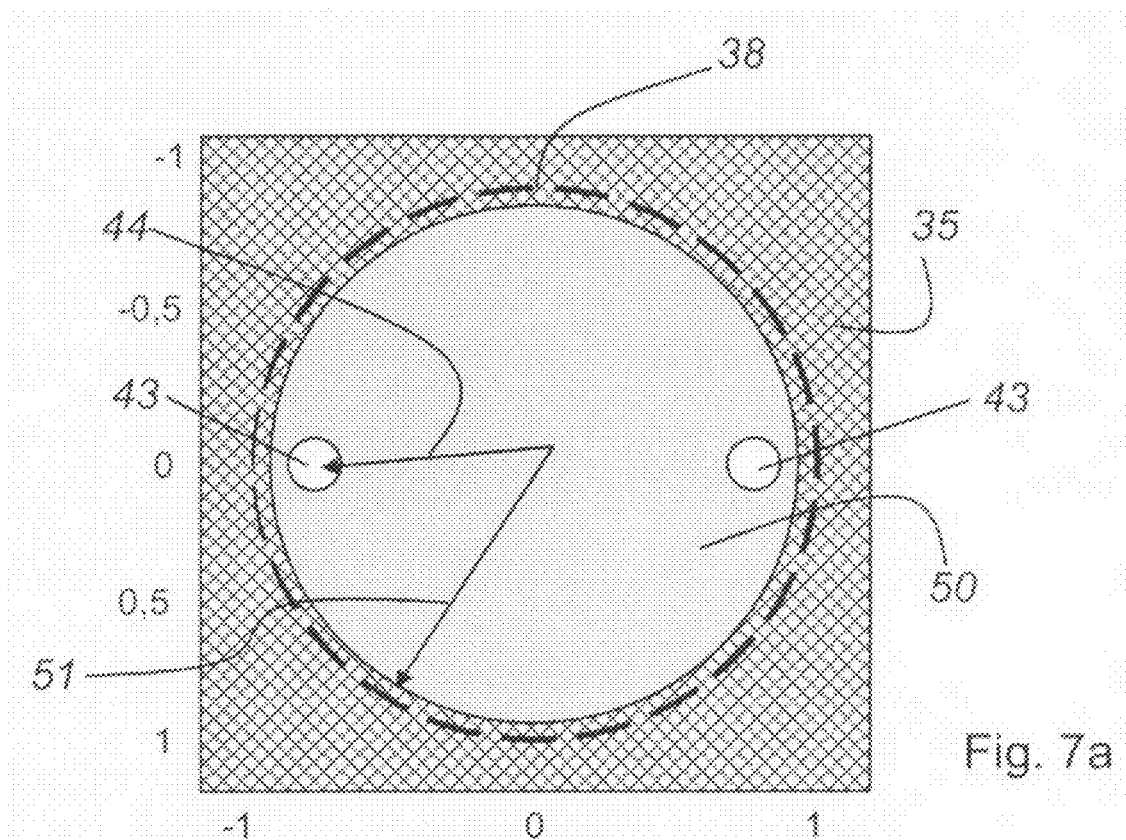
FIG. 7a shows a combined illumination of a circular backlighting and a dipole illumination.
Figure 7B:
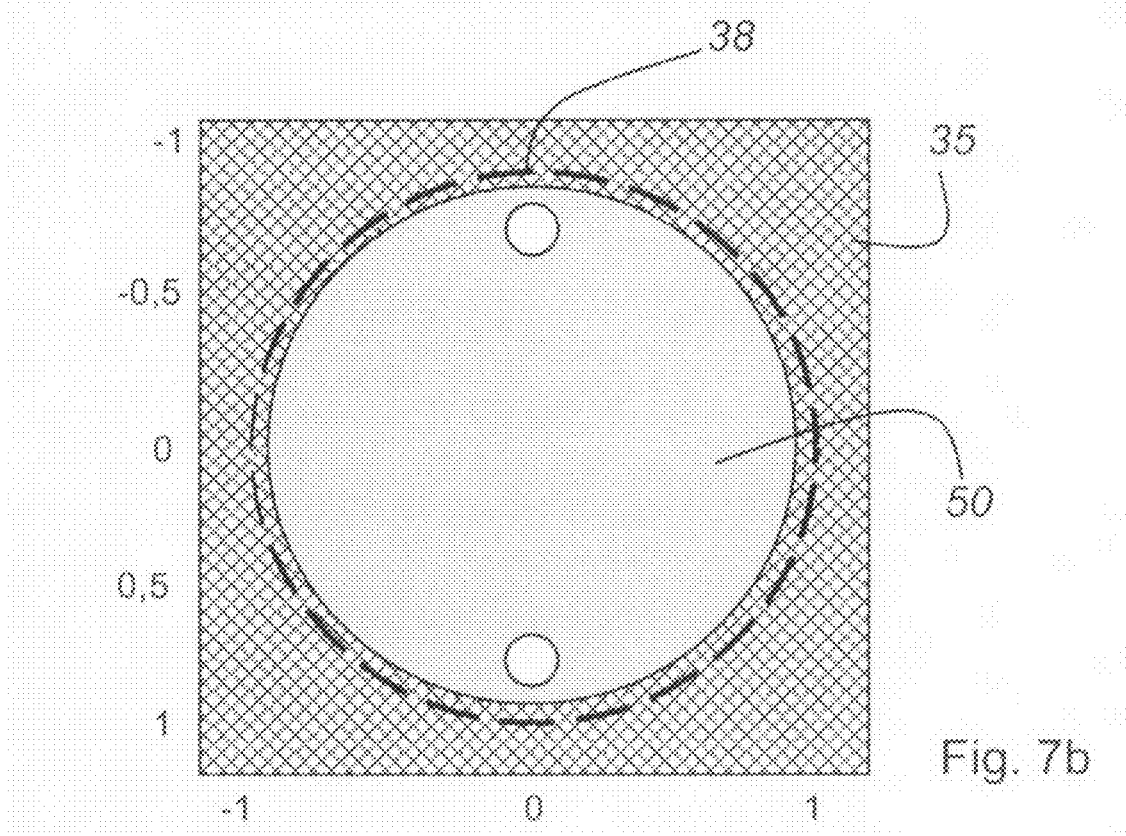
Figure 7C:
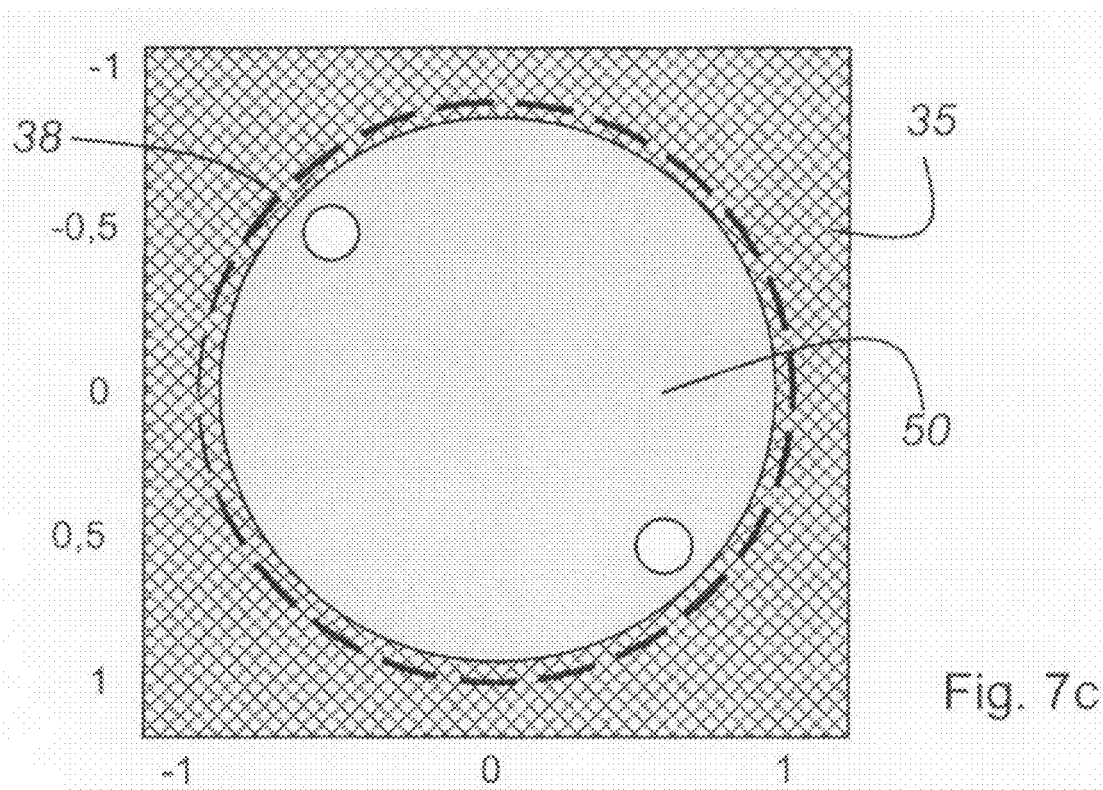
Figure 7D:
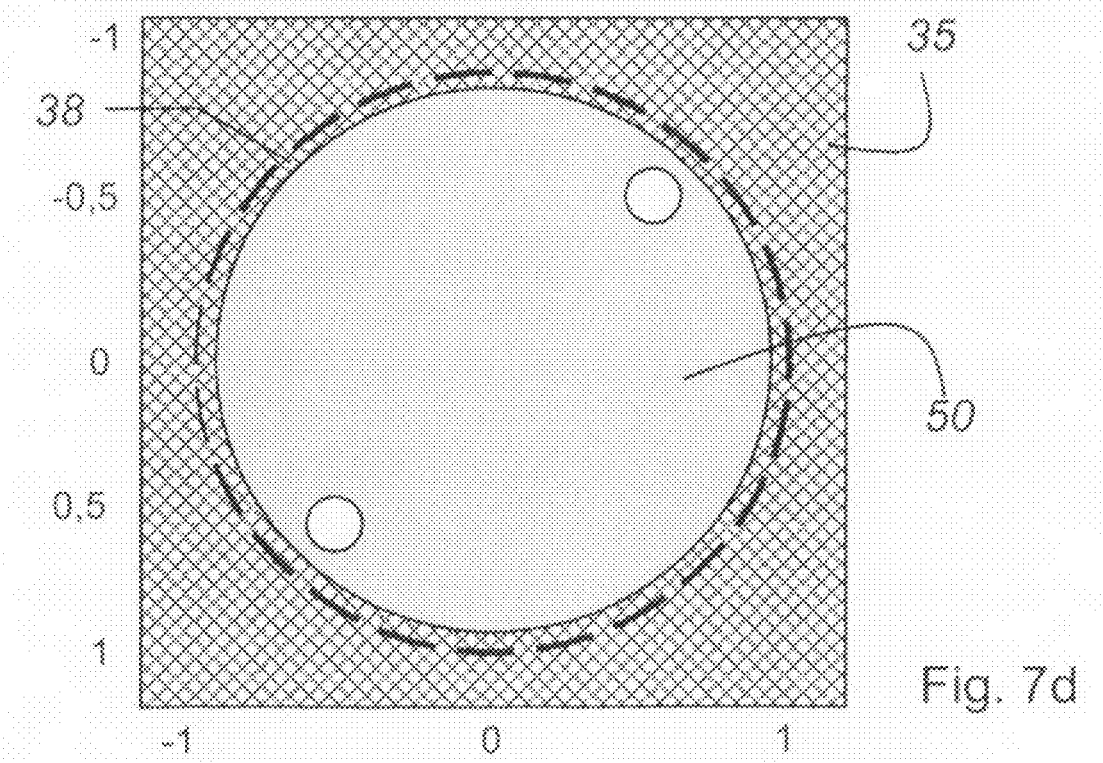

Optical element 35 shown in FIGS. 5a and 5b shows a quadrupole arrangement of illumination poles 45. Illumination poles 45 of the quadrupole illumination are also located within the radius of objective pupil 38. The parameters to be set are also radius 44 on which illumination poles 45 for the illumination are arranged. A further parameter is the aperture $NA_{quadrupole}$ of each illumination pole 45 of the quadrupole illumination. In addition, the orientation of each illumination pole 45 in the quadrupole arrangement may also be set. FIG. 5b shows an orientation of individual illumination poles 45 that is rotated by 45°. It is clear that other orientations may be set.

FIGS. 6a, 6b, 6c and 6d show a further embodiment of optical element 35 for generating an illumination structure for the substrate or the mask. Ring illumination 40 is comparable to ring illumination 40 in FIGS. 2a, 2b, 2c and 2d. The difference shown in this embodiment consists in backlighting 50 being used in addition to ring illumination 40. Thus the embodiment represents a combined illumination of circular backlighting 50 and ring illumination 40. The parameters to be set are a radius 51 of the backlighting, inner aperture 41 of ring illumination 40, outer aperture 42 of ring illumination 40, and the intensity ratio between ring illumination 40 and backlighting 50 in objective pupil 38.

FIGS. 7a, 7b, 7c and 7d show a further embodiment of the structured illumination. The structured illumination is a combination of circular backlighting 50 and a dipole illumination having two illumination poles 43. The arrangement of illumination poles 43 is comparable to the arrangement of illumination poles 43 shown in FIGS. 3a, 3b, 3c and 3d. The parameters of the structured illumination to be set in this embodiment are radius 51 of the backlighting, radius 44 on which illumination poles 43 of the dipole illumination are located, the aperture of each illumination pole 43, the orientation of illumination poles 43, and the ratio between the intensities of the illumination by illumination poles 43 and backlighting 50 in objective pupil 38.

Figure 8A:
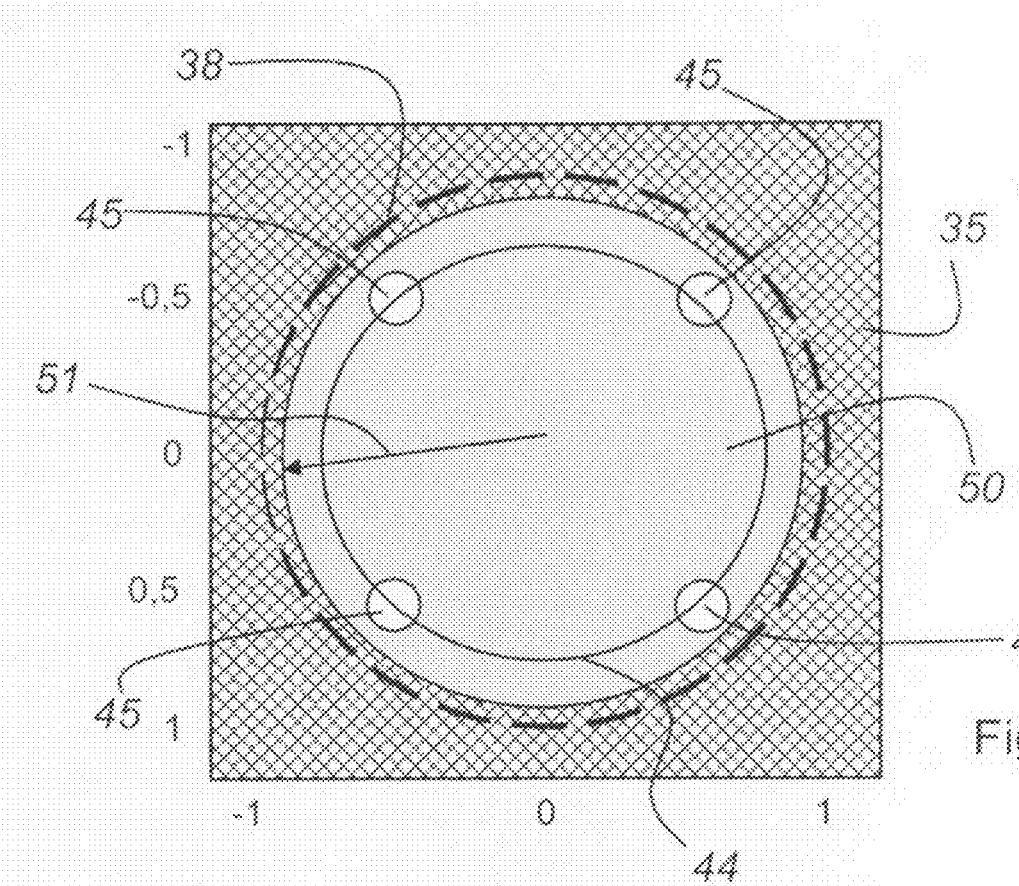
FIG. 8a shows a combined illumination of a circular backlighting and a quadrupole illumination.
Figure 8B:
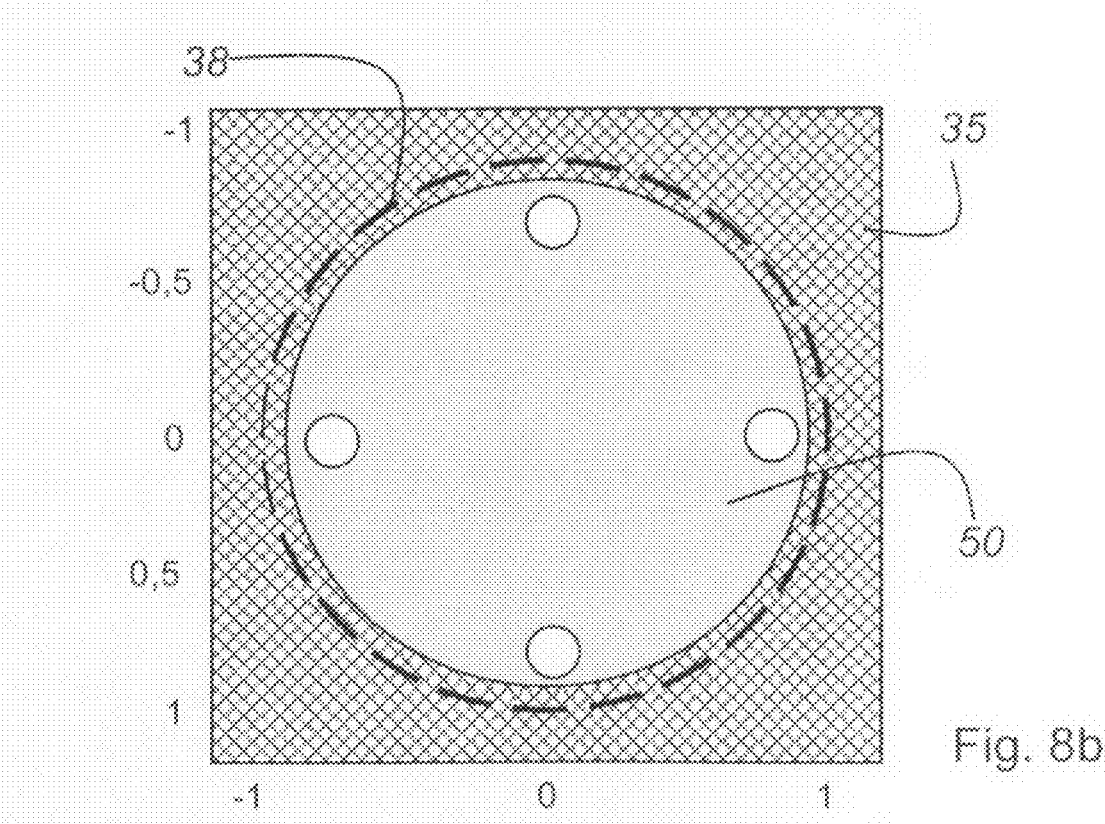

The embodiment shown in FIGS. 8a and 8b shows a quadrupole arrangement of illumination poles 45 combined with circular backlighting 50. The parameters to be controlled or set are also radius 51 of backlighting 50, radius 44 on which illumination poles 45 of the quadrupole illumination are located, the aperture of each illumination pole 45, the orientation of the quadrupole arrangement, and the intensity ratio between backlighting 50 and the illumination by illumination poles 45.

FIG. 9a and FIG. 9b show an optical element 88 with which, for example, the polarization of the illumination light on substrate 2 may be set. In order to be able to set the polarization, at least one optical element 88 influencing the polarization is required in the optical illumination path. FIG. 9a shows optical element 88 with which a linearly polarized illumination may be generated in objective pupil 38. This illumination type may be easily realized by a polarization filter in intermediate image plane 8b or 9b of pupil 8 or 9 (or also directly in pupil access 31 of condenser 8).

Optical element 88 may also consist of a microlens array in combination with a polarizing element. This combination results in a hexagonal arrangement of the polarization. Individual pupil elements 90 serve to generate a field homogenization, and each has a corresponding polarization. Although a hexagonal arrangement is used here, this does not necessarily have to be the case. Any other form of geometric implementation of the arrangement may be contemplated as long as a homogeneous field illumination or illumination of objective pupil 38 may be achieved thereby. The arrangement of pupil elements 90 illustrated here is not to be considered limiting in any way. In the arrangement shown in FIG. 9a, all pupil elements 90 are polarized in the X-direction. This may be achieved by combining a polarization filter with the microlens array. The arrangement shown in FIG. 9b shows a polarization of all pupil elements 90 in the Y-direction.

Figure 10A:
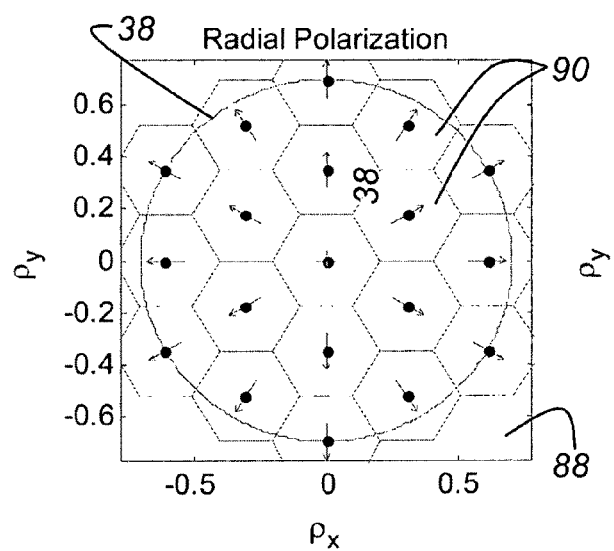
FIG. 10a shows a further embodiment of the illumination pupil, wherein a radial polarization is generated by the polarization of the individual segments.
Figure 10B:
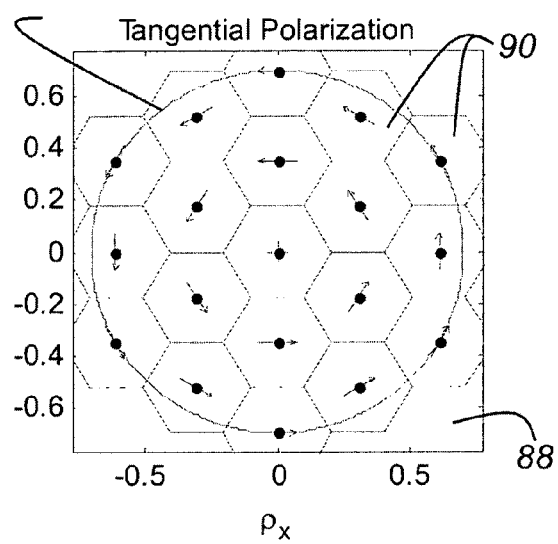
FIG. 10b shows a further embodiment of the illumination pupil, wherein a tangential polarization is generated by the polarization of the individual segments.

The embodiments of optical element 88 illustrated in FIGS. 10a and 10b show a further possibility to set the polarization of individual pupil segments 90. In FIG. 10a, the polarization of individual pupil segments 90 is set such that a radial polarization of illumination pupil 38 may be achieved. In the arrangement shown in FIG. 10b, individual pupil segments 90 are polarization-set such that an overall tangential polarization of illumination pupil 38 may be achieved.

Figure 11A:
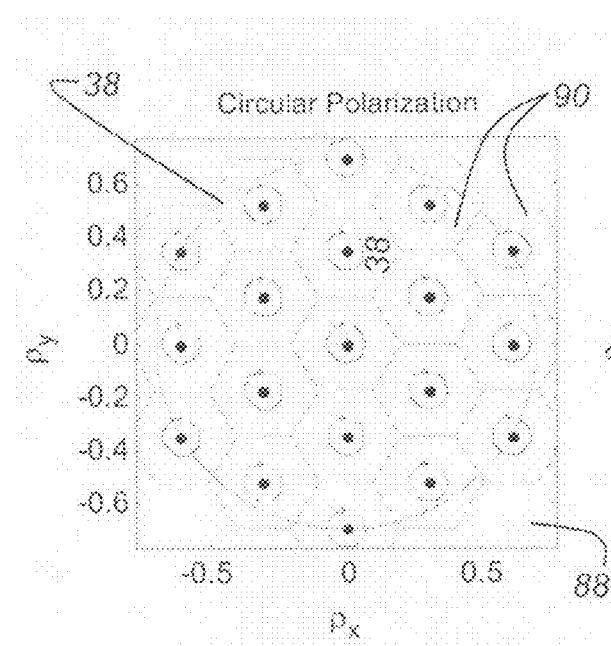
FIG. 11a shows an example of a circular polarization, wherein the individual hexagonal segments of the illumination pupil are formed by circular polarization.
Figure 11B:
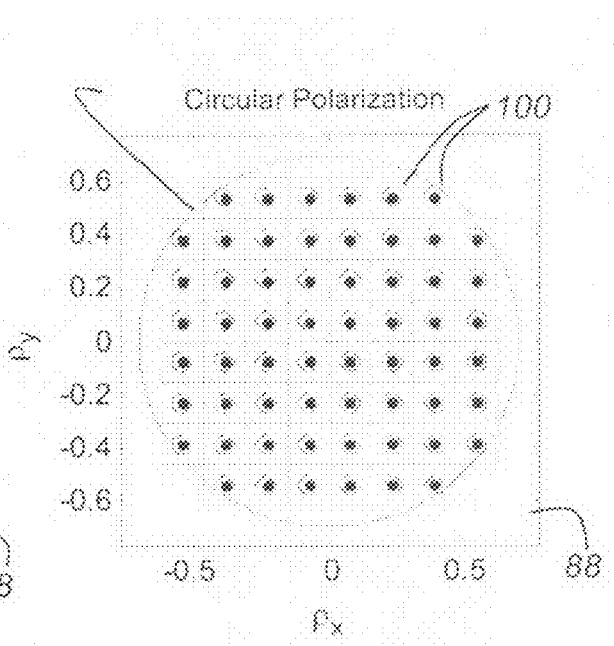
FIG. 11b shows a further embodiment of the circular polarization formed with an orthogonal array; and, FIG. 12 shows an apodized illumination pupil.

FIGS. 11a and 11b show a further embodiment of the polarization setting of further optical element 88. In FIG. 11a, individual hexagonal pupil elements 90 are circularly polarized. The result is an overall circular polarization of the entire objective pupil 38. The embodiment shown in FIG. 11b also shows a circular polarization of individual pupil elements 100. However, the individual pupil elements do not have a hexagonal structure, but are formed to be square. With this arrangement, there may also be set an overall circular polarization of objective pupil 38.

Figure 12:
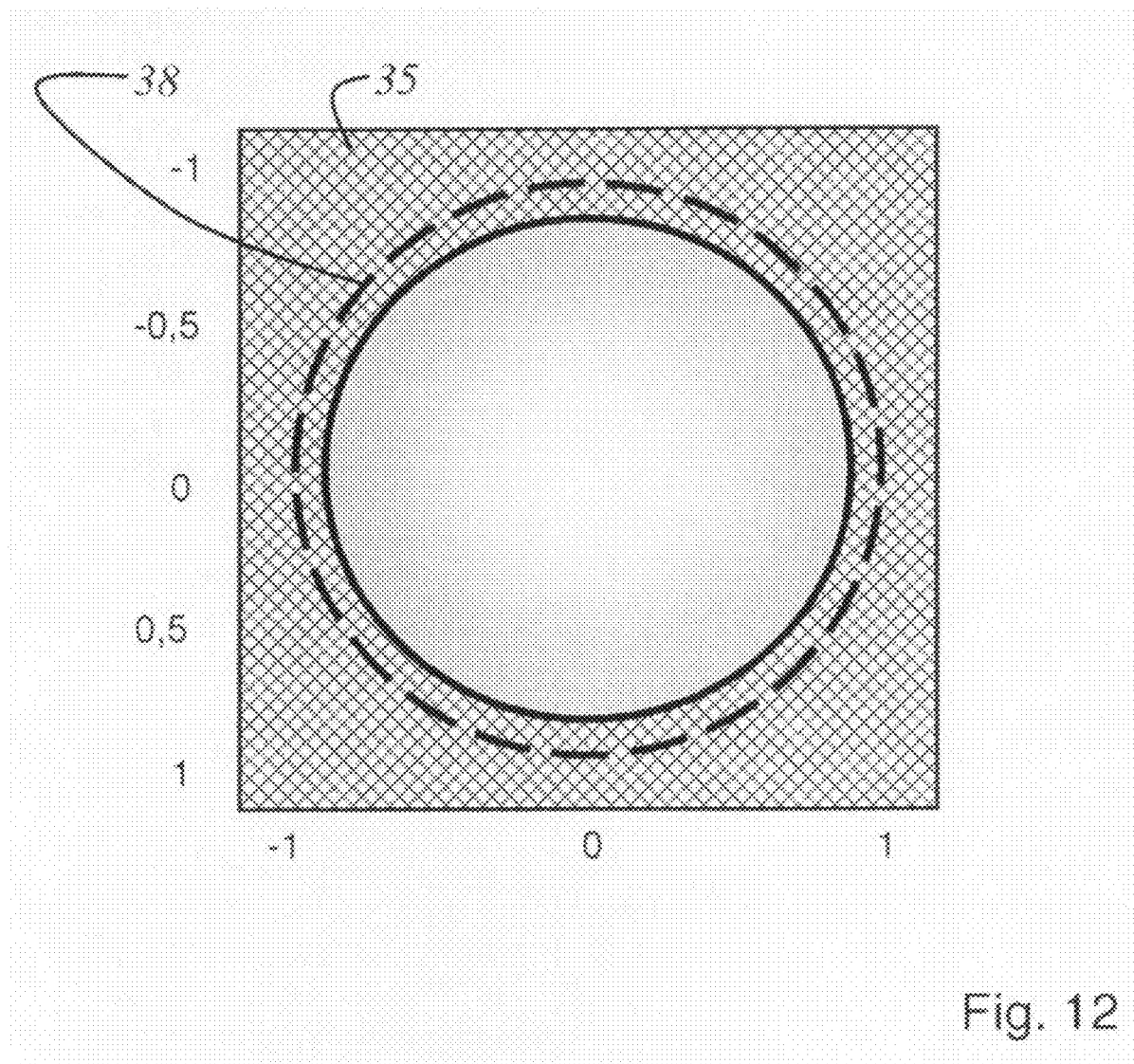

FIG. 12 shows another embodiment of optical element 35, which may be inserted in the optical illumination path of coordinate measuring machine 1. It is also a circular illumination pupil arranged within objective pupil 38. The illumination pupil is implemented as an apodized illumination pupil.

Small defects on the structure elements may result in the structure being measured at slightly different positions in coordinate measuring machine 1 depending on the illumination. Depending on the type of illumination, the structure may thus be measured with a systematic measurement error. In order to measure the position and/or dimension of the various structure elements on the mask correctly with respect to each other, it is thus advantageous to use the same illumination as in a stepper so that the customer can decide whether the structures exposed in the resist have the right geometric dimensions and/or position.

In addition, the contrast on the wafer may also be influenced by a suitable choice of polarization of the objective pupil for a suitable structure on the mask. Small defects or structures may again result in slightly different measurement results depending on the polarization of the light used. These systematic measurement errors affect the quality of the measurement. Depending on the structures on the mask, it may be advantageous to operate with a linear polarization (see FIG. 9a or FIG. 9b), a circular polarization (see FIG. 10a) or a tangential polarization (see FIG. 10b) or a radial polarization or without polarization. In this case, too, it is advantageous for the customer to use the same polarization state during the measurement of substrate 2 as for the exposure in the stepper.

Also, it might be advantageous to operate with a non-homogeneous, but generally rotationally symmetric pupil illumination (see FIG. 12). These methods are summed up by the term apodization. In this way, systematic measurement errors caused by adjacent structures near the resolution limit may be minimized.

There are several possibilities how to achieve the structuring of the illumination pupil. The structuring of the pupil may easiest be achieved in an intermediate image of the entrance pupil. With suitable imaging optics (measurement objective), it is then also homogeneously illuminated. An aperture having the required structure for the illumination may, for example, be inserted in this plane. This allows realizing a dipole or quadrupole illumination in a very easy way. For this purpose, the light is allowed to pass at the places of the pupil where it is needed in the illumination. Ring pupils cannot be produced by this method. This is only possible if the ribs needed for holding the inner shading do not have any negative effect on the measurement results of coordinate measuring machine 1. However, this will normally not be the case. By means of simple apertures, the size of the illumination pupil may also be reduced and thus the desired degree of coherence may be set.

In a further embodiment, a plate having a structured area may also be inserted in the intermediate image of the pupil. The structured area may, for example, be generated by vapor deposition of metal layers. Chromium is a possible element with which the structured areas may be generated. The areas may then be structured such that light may only pass at desired places. As mentioned above, this structure may be generated by vapor deposition or a lithographic process. If the plate is used as a carrier, this method may also be used to produce ring apertures. The known coating techniques may also be used to realize partially transparent structures allowing an even finer subdivision of the intensity in the illumination pupil. In that way, it is, for example, possible to combine a circular backlighting with a dipole illumination (see FIGS. 6 to 8). Apertures for the illumination apodization may also be generated by this method. If an inverse structure is applied to the carrier plate, this structure may be used as a reflecting mask.

A further possibility already mentioned is the polarization in the pupil. The polarization state in the pupil may be unpolarized, which is already prior art. According to the present invention, it is now possible to set the polarization directly. In order to be able to set the polarization, at least one optical element influencing the polarization is needed in the optical illumination path. In the easiest case, this is a polarization filter and/or a quarter-waver plate. They allow setting linear and circular polarizations. The more complex radial or tangential polarizations (see FIGS. 10a and 10b) require the use of optical elements divided into individual segments. These optical elements allow setting the polarization differently depending on the place in the pupil. Particularly in the case of field homogenization in connection with microlens arrays, this may easily be realized. In this case, the pupil is not filled homogeneously, but has the structure of the microlenses used.

Now the polarization filters may be applied to the individual elements of the microlens array so that the result is the desired overall polarization. In this case, there are no spurious edge effects at the segment boundaries, because the illumination intensity at these places in the pupil is 0.

What is claimed is:

1. A coordinate measuring machine for a structured illumination of substrates comprising an incident light illumination means or a transmitted light illumination means, or combinations thereof, each defining an optical illumination path, at least one optical element positioned at a predetermined location in the optical illumination path, wherein the optical element is operatively arranged to manipulate at least one of a size, a type, or a polarization of the illumination of a pupil such that the structured illumination of the substrate in the coordinate measuring machine corresponds to the structured illumination of the same substrate in an exposure process with a stepper.

2. The coordinate measuring machine according to claim 1, wherein the at least one optical element is attached to an exchange element and is thus positionable in the optical illumination path as required.

3. The coordinate measuring machine according to claim 1, wherein the optical element is a plane-parallel plate or a non-plane-parallel plate.

4. The coordinate measuring machine according to claim 1, wherein the optical element provides an illumination with an adjustable numerical aperture.

5. The coordinate measuring machine according to claim 1, wherein the optical element is operatively arranged for providing a ring-shaped illumination.

6. The coordinate measuring machine according to claim 1, wherein the optical element operatively arranged for providing an illumination with two illumination poles.

7. The coordinate measuring machine according to claim 1, wherein the optical element is operatively arranged for providing an illumination with four illumination poles.

8. The coordinate measuring machine according to claim 1, wherein the optical element is combined with at least one polarizing element arranged in the optical illumination path.

9. The coordinate measuring machine according to claim 8, wherein the optical element includes a microlens array combined with a polarizing element.

10. The coordinate measuring machine according to claim 9, wherein each element of the microlens array is provided with its own polarization filter.

11. A method for the structured illumination of substrates with an incident light illumination means and/or a transmitted light illumination means, each defining an optical illumination path, comprising the steps of:
positioning at least one optical element in the optical illumination path; and,
manipulating at least one of a size, a type, or a polarization of the illumination of a pupil by the optical element such that the structured illumination of the substrate in the coordinate measuring machine is adapted to the structured illumination of this substrate in an exposure process with a stepper.

12. The method according to claim 11, wherein the optical element is operatively arranged for providing an illumination that is adjusted with a defined numerical aperture.

13. The method according to claim 12, wherein the optical element is operatively arranged for providing a ring-shaped illumination, wherein the inner and outer illumination apertures are adapted as required.

14. The method according to claim 11, wherein the optical element is operatively arranged for providing an illumination with two illumination poles, wherein the illumination aperture of the illumination poles and/or the radius on which the illumination poles are arranged within the objective pupil are changed as required.

15. The method according to claim 11, wherein the optical element is operatively arranged for providing an illumination with four illumination poles, wherein the illumination aperture of the illumination poles, the radius on which the illumination poles are arranged within the objective pupil, or both, are changed as required.

* * * * *